United States Patent [19]

Johnson et al.

[11] Patent Number: 5,110,222
[45] Date of Patent: May 5, 1992

[54] POSITIVE CONTACT, SELF RETAINING BEARING SEALS

[75] Inventors: Bruce H. Johnson; Lawrence E. Larsen; Edmund F. Welch, all of Kansas City, Mo.

[73] Assignee: The United States of America as represented by the United States Department of Energy, Washington, D.C.

[21] Appl. No.: 473,800

[22] Filed: Feb. 2, 1990

[51] Int. Cl.$^5$ .................................. F16C 33/78
[52] U.S. Cl. ......................... 384/482; 277/95
[58] Field of Search .............. 384/482, 140, 607, 481, 384/139; 277/95

[56] References Cited

U.S. PATENT DOCUMENTS

| 2,600,434 | 6/1952 | Saywell | 286/11 |
| 2,914,365 | 11/1959 | Spicacci | 384/482 |
| 3,097,896 | 7/1963 | Wasley | 384/482 |
| 3,642,335 | 2/1972 | Takahashi et al. | |
| 3,869,181 | 3/1975 | Barber | |
| 4,632,404 | 12/1986 | Feldle et al. | 384/140 |
| 4,687,349 | 8/1987 | Pachuta | 384/477 |
| 4,863,293 | 9/1989 | Sytsma | 277/95 |

Primary Examiner—Lenard A. Footland
Attorney, Agent, or Firm—Anne D. Daniel; James H. Chafin; William R. Moser

[57] ABSTRACT

An ultra-low friction bearing including an inner race, an outer race, bearing elements engaged between the inner and outer races and a seal between the inner and outer races is disclosed. The seal includes first and second sealing washers. The first washer has an outer diameter greater than an inner diameter of the outer race and an inner diameter greater than the outer diameter of the inner race. The second washer has an inner diameter less than the outer diameter of the inner race and an outer diameter less than the inner diameter of the outer race. The first washer slidably engages the outer race, the second washer slidably engages the inner race and the washers overlap and slidably engage one another. One of the washers snap fits into its respective inner or outer race while the other washer engages a stepped surface of the other of the inner and outer races. The grooved and stepped surface are offset from one another in a longitudinal direction of the races such that the washers are conically loaded thus providing a seal between the inner and outer races sufficient to prevent lubricant and contaminating particles from passing therethrough. The washers are made from a non-metallic semi-flexible low-modulus material.

16 Claims, 4 Drawing Sheets

POSITIVE CONTACT, SELF RETAINING BEARING SEALS

The Government has rights in this invention pursuant to Contract No. DE-AC04-76DP00613 awarded by the United States Department of Energy to Allied-Signal Inc.

BACKGROUND OF THE INVENTION

1. Field of the Invention

The present invention relates generally to bearing seals and particularly to ultra-low friction bearing seals useable in low torque miniature mechanical mechanisms.

2. Description of the Related Art

It is known to provide bearing shields and seals between inner and outer bearing races for protecting bearings located therebetween. Since bearing shields do not fully contact both the inner and outer races, certain contaminants can enter the bearing increasing friction and decreasing the useful life of the bearing. Presently available bearing seals consist of a single semi-rigid disk that is held in placed in the outer race by a fine wire retaining ring. A hole in the center of the disk clears a step on the inner race. While these seals are designed to contact both the inner and outer races, they present a number of problems. The fine wire retaining ring can pop loose causing catastrophic failure. Additionally, these seals can allow contaminants to pass therethrough, are subject to high friction torque and are not versatile over a wide range of operating conditions.

U.S. Pat. No. 2,600,434 to Saywell discloses a bearing seal including inner and outer washers which can be biased against one another. These washers are held in position either by retaining rings or by fixed attachment directly to one of the inner or outer races. The washers are made from a "spring" metal material.

U.S. Pat. No. 2,914,365 to Spicacci discloses a bearing seal made from a single washer which is snap-fitted between inner and outer races. This design is susceptible to large fluctuates in friction generated torque due to concentricity, alignment and tolerances of the bearing races as well as axial shifting. Spicacci also discloses the use of a retaining element to aid in keeping the seal in place. This retaining element requires the inner race to be made longer than standard boundary dimensions.

U.S. Pat. No. 4,687,349 to Pachuta discloses a bearing having a labyrinth seal and full-contact seal which co-operates with a shield. This construction is complex and therefore costly. Additionally, the elements of the seal which contact the inner and outer races are fixedly attached thereto.

A need is therefore identified for an improved bearing seal overcoming the above-described limitations and disadvantages of the prior art.

OBJECTS OF THE INVENTION

It is an object of the present invention to provide a bearing seal which contains no gaps while providing a positive contact at all times between the seal and the outer and inner races.

It is another object of the present invention to provide a bearing seal which shows no adverse, affects due to reversing axial loads or tolerance buildups.

It is another object of the present invention to provide a bearing seal which does not exhibit any of the problems concerning concentricity, alignment and diameter tolerances existing in the prior art.

It is another object of the present invention to provide a bearing seal which does not require a fragile retaining ring to maintain the seal secured to the outer race, thus eliminating all the problems associated with the use of retaining rings.

It is a further object of the present invention to provide a bearing seal which can be simply and positively retained in contact with the inner and outer races without requiring complicated machining of the races.

SUMMARY OF THE INVENTION

To achieve the foregoing and other objects, and in accordance with the purposes of the present invention as described herein, an improved bearing seal is provided. The present invention makes use of a bearing seal including inner and outer flat, flexible non-metallic "washers" that are self retaining and positioned between inner and outer bearing races to maintain a constant axial force against the bearing races thereby insuring complete sealing contact at all times. The washers can be made from a semi-flexible low-modulus material so as to be flexible enough to be snapped into a groove in one of the races of the bearing and yet rigid enough to stay in place in the groove while exerting enough axial force to obtain an effective seal. Additionally, due to the semi-flexible characteristics of the washers they are capable of bending under reverse loading conditions. Since the rings are slidably engaged with the inner and outer races and with each other they provide for ultra-low friction torque. The inner and outer washers are mounted in a groove and step contained in one of the inner and outer races, respectively, which are offset from one another so as to provide a conical loading of the two flat washers. No additional mounting structure is required and thus a simple, inexpensive and highly effective bearing seal is provided.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modifications in various aspects without departing from the scope of the invention. Accordingly, the drawings and description will be regarded as illustrative in nature and not as restrictive.

BRIEF DESCRIPTION OF THE DRAWINGS

The invention will be described in detail with reference to the following drawings in which like reference numerals refer to like elements and wherein.

DETAILED DESCRIPTION OF THE PREFERRED EMBODIMENT

Figure 1:
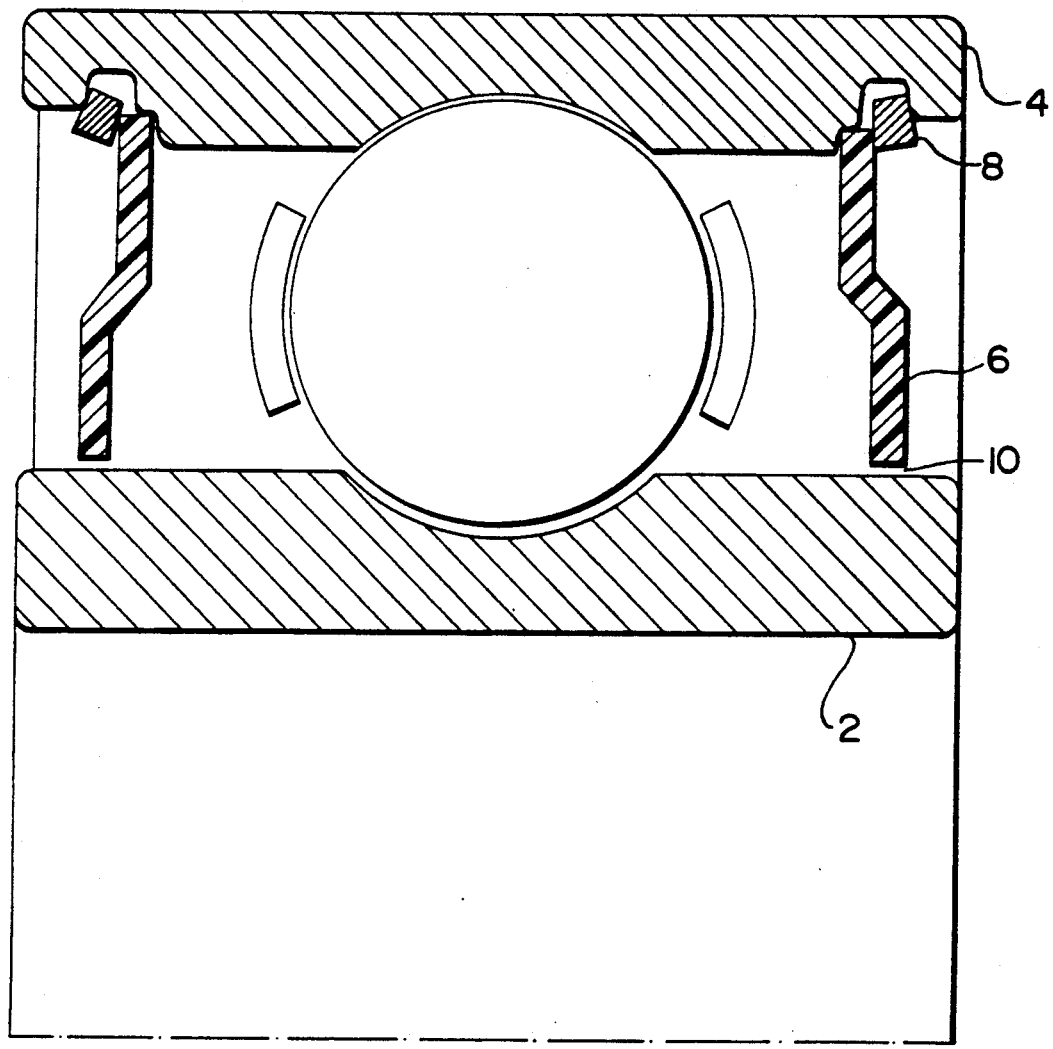
FIG. 1 is a cross-sectional view of a prior art bearing shield.
Figure 2:
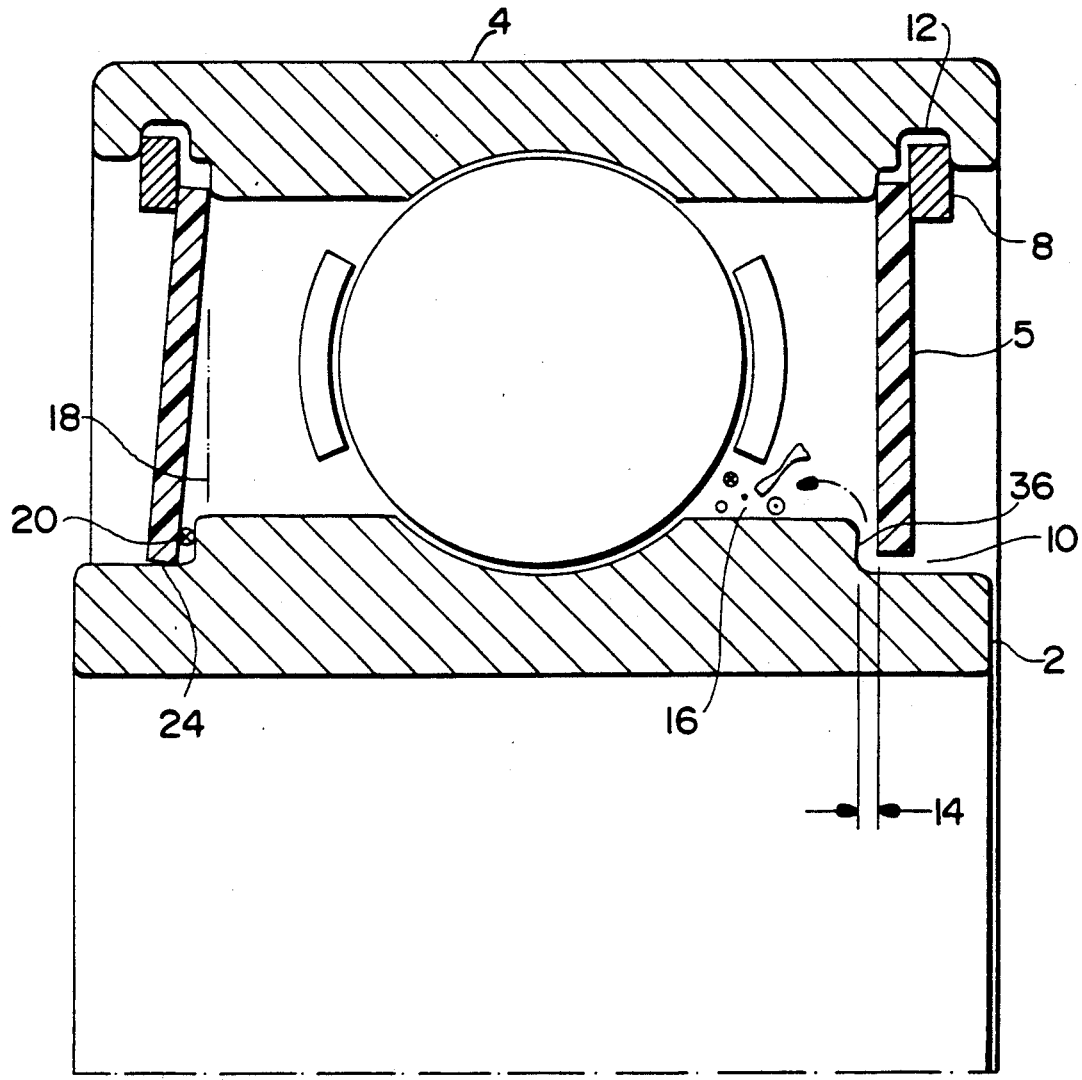
FIG. 2 is a cross-sectional view of a prior art bearing seal.

FIG. 1 shows a bearing shield 6. This shield 6 is located between inner and outer bearing races 2, 4, respectively, and maintained in position by a wire retaining ring 8 which holds an upper end of shield 6 in a groove formed in the outer race 4. Since the shield 6 does not come into direct contact with the inner race 2, certain contaminants can enter the bearing via clearance 10. In an attempt to solve the problems associated with shields, bearing seals, as shown in FIG. 2, have previously been provided.

There are several problems with existing seals for miniature bearings. Presently available configurations, as shown in FIG. 2, consist of a single semi-rigid, glass reinforced, plastic disk 5 that is held in place in the outer race 4 with a fine wire retaining ring 8. A hole in the center of the disk 5 clears a step 36 on the inner race 2. A narrow shoulder on this step is supposed to contact one side of the disk, thereby completing the seal.

In a typical ⅛ inch diameter bore bearing, there is a normal gap 14 of seal to shoulder of 0.001 inch, which can be as large as 0.0052 inches, depending on tolerances and load direction. This can allow grit and wear particles 16 of this size to enter the "sealed" bearing. Such contamination can result in high and erratic torques and greatly reduced bearing life. Thus, these "seals" are really only closer fitting shields. However, unlike a true shield, sometimes a 0.0032 inch overlap of the seal and shoulder occurs (illustrated at 18). This overlap 18 puts considerable pressure against the contact surface by having to deflect the stiff glass-filled disk 5. This results in increased torque and wear of the seal and shoulder with the possibility of shedding fine glass particles and metal fragments into the bearing.

Another series of problems results from a shifting of the axial load. A reversing axial load can cause an erratic torque fluctuation from zero added torque when there is a gap 14 between the shield and shoulder to full seal torque at maximum deflection of the shield. This condition can vary from bearing to bearing depending on the individual tolerance buildup. A gap in the seal can allow abrasive particles 20 to be trapped under the lip. This combined with only a slight axial reversing can greatly increase torque and seal wear, with even more likelihood of abraded material falling into the bearing.

Another problem results when the perpendicular edge 24 of the seal disk 5 rubs against the inner race. This can result in a sudden drastic increase in torque. Due to the tolerances of diameters and concentricity of disk 5, inner race step 36, and outer race groove 12, it is all but impossible to maintain seal contact with the narrow shoulder on the inner race without the associated step touching the seal edge. When this happens, the semi-rigid disk 5 is wedged between the inner race 2 and outer race 4. The disk 5 can be pushed radially out of the way against the locking pressure of the outer metal retaining ring 8, but only with considerable relative force. Conversely, the disk 5 could be pushed off center while installing the bearing, or possibly under vibration. Also, a very small orbital motion of the shaft, caused by a slight bow or an unbalanced load, can cause the inner race 2 to alternately touch and clear. Likewise, rotating the unit could change the direction of radial play resulting in a clearance 10 becoming a rubbing contact 24. None of these conditions would be duplicated and detected while testing in a precision, vertical spindle bearing torque tester, even if all the bearings were 100% tested in this manner.

Problems also exist concerning the fine wire retaining ring 8 that locks the disk 5 to the outer race 4. The fine wire retaining ring 8 is a very flimsy mechanical device. Axial loading of the inner race 2 against the stiff seal disk 5 can apply a considerable axial load to the flattened wire 8 in its shallow groove 12 causing the wire to pop loose in operation. This not only destroys any integrity this seal may have had, but also allows the seal 5 and wire retainer 8 to fall into the gears and levers of the associated mechanism, with potentially catastrophic results. Additionally, the formation of the groove 12 for the retainer 8 and seal 5 in the outer race 4 is a rather intricate, double stepped, close toleranced feature. Also, the installation of the fine wire retaining ring 8 is an operation that cannot readily be performed by the average user. Therefore, the bearing must be supplied by the manufacturer either with or without seals. Any removal and replacement by the user is nearly impossible. Yet, replacement or even initial installation by the user is often very desirable for the purpose of additional cleaning, the addition of proprietary lubricants, or replacement of damaged seals.

Figure 3:
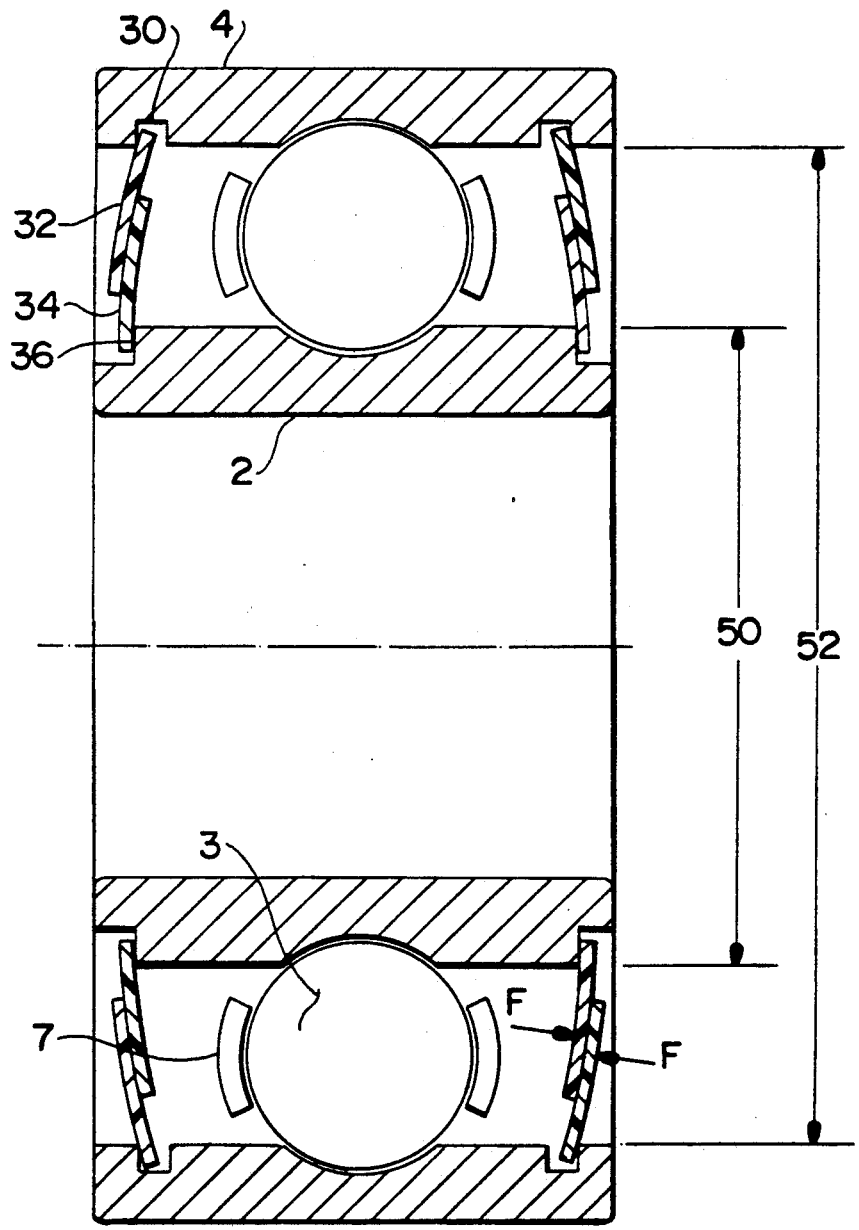
FIG. 3 is a cross-sectional view of a two piece bearing seal of the present invention.

FIG. 3 shows an ultra-low friction bearing of the present invention. The bearing includes inner and outer races 2, 4, respectively, which include a plurality of bearings 3 therebetween. The bearings 3 are held in place by a bearing retainer 7. The bearing seal of the present invention includes two flattened annular washers 32 and 34. Washer 32 has a larger diameter than washer 34 and contacts an inner surface of outer race 4 along surface 38 (see FIG. 4). The second, or smaller washer 34 contacts an outer surface of inner race 2 along surface 40. The washers 32, 34 contact each other along a portion of their surfaces through distance 46 so as to form a positive contact seal which provides great resistance to the passage of lubricant and contaminants therethrough. Washer 32 has an inner diameter which is greater than the outer diameter of inner race 2 and washer 34 has an outer diameter which is less than the inner diameter of outer race 4. By providing the washers with these dimensions, the free edges of the washers 32, 34 will never contact the opposing races 2 and 4, respectively, thus preventing sudden increase in torque due to wedging of the washers between races 2 and 4.

Figure 4:
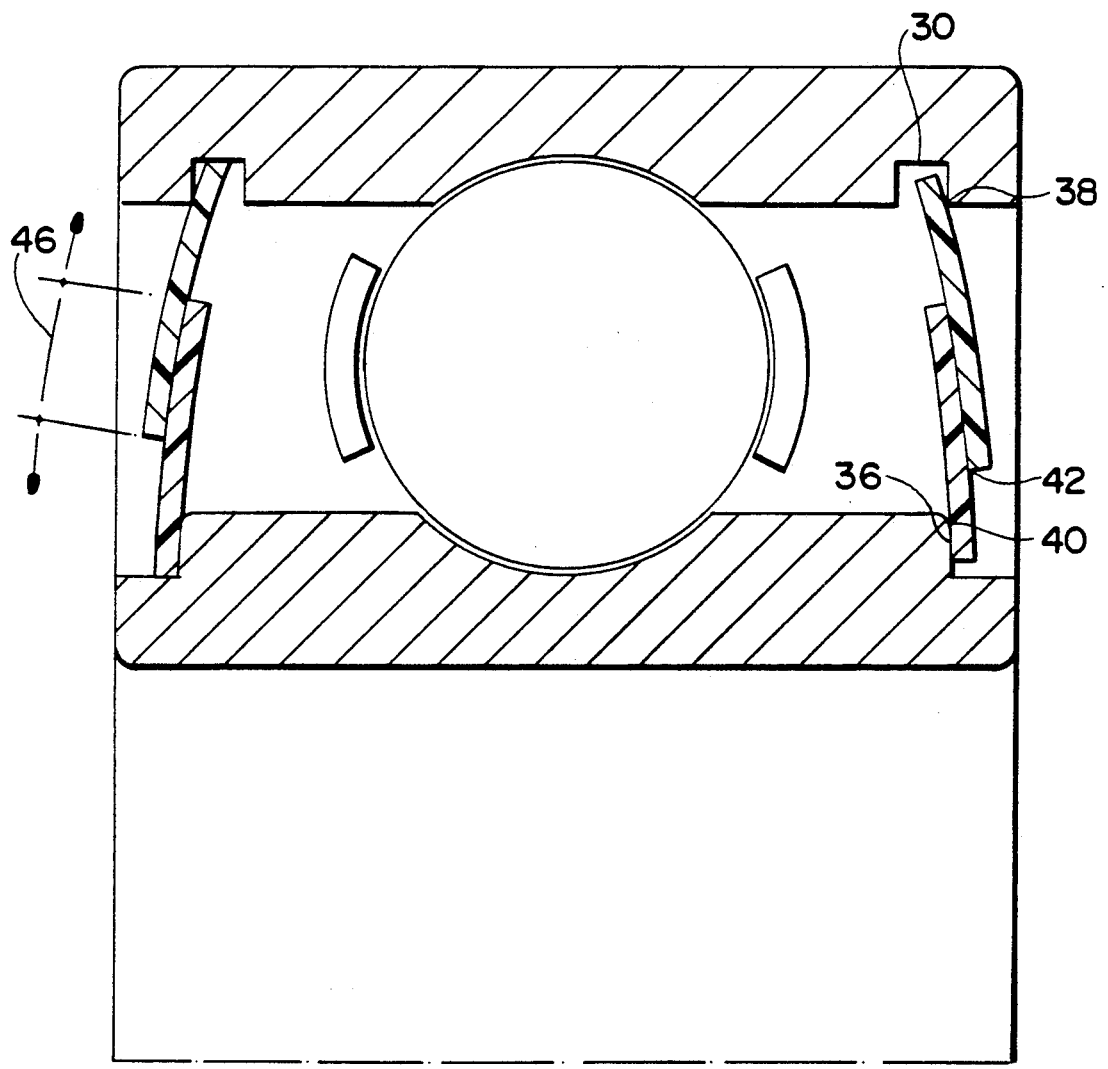
FIG. 4 is an enlarged cross-sectional view of the bearing seal of FIG. 3.

The preferred structure for maintaining washers 32, 34 in place is illustrated in FIGS. 3 and 4. Inner race 2 includes a stepped surface 36 which receives an inner portion of washer 34. Since the inner diameter of washer 34 is less than the outer diameter 50 of inner race 2 a seal is formed along surface 40. An inner surface of outer race 4 includes a groove 30 which receives an outer surface of washer 32. Since the outer diameter of washer 32 is greater than the inner diameter 52 of outer race 4 a seal is formed along surface 38. Groove 30 can be a single-step rectangular groove which does not require any intricate machining steps. Other shapes can be used for groove 30 so long as it adequately maintains washer 32 in place without the need for a retaining ring. The groove 30 and step 36 are offset from one another so that when washer 32 is placed over washer 34 and snapped into groove 30 the washers will exert a force F (shown in FIG. 3) against one another. Although the groove 30 is illustrated as being on the outer race with the stepped surface 36 on the inner race, the location of these surfaces can be reversed. By making the washers 32, 34 from a semi-flexible low-modulus non-metallic material, and by selecting an appropriate offset between groove 30 and step 36, the washers 32, 34 are retained in place without any additional structural elements and a positive contact seal is formed. The seal between washers 32, 34 is achieved by the conical loading force F which is generated between the two washers 32, 34. This force F when applied against the semi-flexible low modulus washers 32, 34 causes them to assume a "Belleville" washer shape. The positive self-retention feature depends on the radial compressive stresses of the washers 32, 34 for which the seal material is fairly rigid, whereas the sealing pressure is generated by bending stresses of opposed conical loading of the washers for which the seal material is very flexible. The choice of a seal material which is rather flexible is also important because it allows full contact between imperfect misaligned surfaces even when using low axial forces. This results in a good seal with a low frictional torque, with no sacrifice of seal retention force.

The self-retaining structure of the present invention results in the washers 32, 34 being slidably retained between inner race 2 and outer race 4. This unique omission of any fixed attachment of the two seals allows sliding between mating parts to occur at whichever of three interfaces 38, 40, 42 that can withstand the least torque. For example, sliding will occur between either the outer race 4 and washer 32, washers 32 and 34, or inner race 2 and washer 34. The inventors have observed that sliding usually occurs between inner race 2 and seal 34 which is the minimum friction radius. Additionally, the three independent sliding surfaces provide a unique double redundancy if the interface with the minimum friction radius should have an increase in frictional torque. Elimination of the retaining ring provides for a simpler structure and greatly reduces the likelihood of catastrophic failure due to the seal "popping" loose. A relatively high compressive load, properly applied, is required to snap the seal in place. Conversely, the same high load must be applied in reverse to dislodge the seal. This can only be obtained practically with the sharp end of a probe properly applied to the seal. Similarly, any user of the present invention can easily replace or install the seals themselves by using an inexpensive tool for compressing the outer seal half.

The seals can be tailored readily to meet a variety of very specific conditions. With only slight restrictions on seal geometry, one standard set of bearing races can accommodate a variety of seal thicknesses and materials. As the seals are inexpensive die-stamped washers, and easily installed, the user can readily experiment as to the characteristics and trade-offs which best suit his exact needs. A washer of 0.003 to 0.005 inches thick, unfilled polytetrafluoroethylene (PTFE) or fluorinated ethylene propylene (FEP), adjusted to give a thrust in the range of ¼ ounce is a good low torque combination for 90% of miniature bearing applications. However, ultra-low torques would be obtained by inserting 0.0015-0.0025 inch thicknesses of the same material in the same standard grooves, but at some risk of not maintaining complete seal contact throughout the entire axial range. Conversely, if flying particles or packing of contaminants are the problem, then slightly thicker washers could be installed. This not only gives a stiffer seal from the thicker material, but automatically increases the offset at the same time, thus increasing the seal force, but with higher seal wear and an increase in operating torque. Graphite or molybdenum disulfide filled PTFE might be the best choice of continuous high speed operation, giving increased wear resistance at only slightly higher torques. Silicone oil filled PTFE would do well in those environments that can tolerate silicone oils. Polyimide sheet could be a good high temperature choice, with some sacrifice in torque and installation ease. Washers made from poly ether ether ketone can be easily installed without permanent deformation due to its high ratio of yield strength to elastic modulus. The inner and outer washers also can be made from different materials.

Although the present seal is highly useful in miniature bearing systems, it can also be used in larger bearings. For example, the seal can be used as a bearing grease retainer. Oils might seep past the seal interfaces, but medium viscosity greases could also be retained with moderate seal pressures. Both internal and external vapor pressure would equalize automatically with no harm or permanent dislocation to the retainer, a unique feature for a seal of this simplicity. Relubrication could be performed without removing the seals via a hypodermic needle inserted parallel to the face between the two washers.

Although a specific example is disclosed, the present invention is applicable to any type of bearing, particularly where ultra-low friction and high resistance to contamination is a requirement. Although the figures illustrate bearing assemblies which use rolling elements, it is understood that the present invention can be used with any type of assembly which rotatably supports a load, such as, for example, electromagnetic bearings and journal bearings. Accordingly, the preferred embodiments of the invention as set forth herein are intended to be illustrative, not limiting. Various changes may be made without departing from the spirit and scope of the invention as defined in the following claims.

What is claimed is:

1. A bearing comprising:
   an inner race;
   an outer race;
   bearing means engaged between the inner and outer races;
   means for sealing a space between the inner and outer races, said means for sealing including first and second sealing washers, said first washer having an outer diameter greater than an inner diameter of the outer race, said second washer having an inner diameter less than the outer diameter of the inner race, said first and second washers overlapping one another and being biased against one another an amount sufficient to prevent lubricant and lubricant contaminating particles from passing therethrough; and
   a groove in one of said inner and outer races wherein one of said first and second sealing washers is snap-fitted into said groove such that it is self-retaining and further holds the other of said first and second washers in place between the inner and outer races.

2. The bearing of claim 1, wherein said first washer slidably engages said outer race, said second washer slidably engages said inner race and said first and second washers slidably engage each other to define three friction interfaces.

3. The bearing of claim 1, wherein said inner race includes a step on the outer surface of a first end thereof, an inner surface of said second washer being inserted into said step; said outer race includes said groove on the inner surface of a first end thereof, an outer surface of said first washer being inserted into said groove; and said step and groove being offset from one another in a longitudinal direction of said races such that the washers are biased towards each other.

4. The bearing of claim 1, wherein the washers are made from a semi-flexible low-modulus material.

5. The bearing of claim 4, wherein said material is selected from the group consisting of unfilled polytetrafluoroethylene, unfilled fluorinated ethylene propylene, graphite filled polytetrafluoroethylene, molybdenum disulfide filled polytetrafluoroethylene, silicone oil filled polytetrafluoroethylene, poly ether ether ketone and polyimide.

6. The bearing of claim 1, wherein said washers, when mounted between said inner and outer races are conically loaded.

7. The bearing of claim 1, wherein said first washer has an inner diameter greater than the outer diameter of the inner race such that said first washer does not contact the inner race, and the second washer has an outer diameter less than the inner diameter of the outer race such that said second washer does not contact the outer race.

8. The bearing of claim 1, wherein said groove is rectangular in cross-section.

9. A bearing comprising:
an inner race;
an outer race;
bearing means engaged between the inner and outer races;
first and second washers for mounting between the inner and outer races, said first washer being larger in diameter than said second washer; and
means for mounting said first and second washers between the inner and outer races so as to provide a seal between the inner and outer races, said means slidably mounting said first washer to the outer race, said second washer to the inner race and said first and second washers to each other.

10. The bearing of claim 9, wherein said first washer has an outer diameter greater than an inner diameter of the outer race and an inner diameter greater than an outer diameter of the inner race, said first washer slidably engaging the outer race but not contacting the inner race, and the second washer has an inner diameter less than the outer diameter of the inner race and an outer diameter less than the inner diameter of the outer race, said second washer slidably engaging the inner race but not contacting the outer race.

11. The bearing of claim 9, wherein one of said inner and outer races includes a groove on a first end thereof, the other of said inner and outer races includes a step on a first end thereof, wherein one of said first and second washers is snap-fitted into said groove such that it is self retaining and further holds the other of said first and second washers in place between the inner and outer races.

12. The bearing of claim 11, wherein said groove is rectangular in cross-section.

13. The bearing of claim 11, wherein said groove and step are offset from one another in a longitudinal direction of said races such that said washers are conically loaded.

14. The bearing of claim 11, wherein said groove is on said outer race and said step is on said inner race.

15. The bearing of claim 9, wherein the washers are made from a semi-flexible low-modulus material.

16. The bearing of claim 15, wherein said material is selected from the group consisting of unfilled polytetrafluoroethylene, unfilled fluorinated ethylene propylene, graphite filled polytetrafluoroethylene, molybdenum disulfide filled polytetrafluoroethylene, silicone oil filled polytetrafluoroethylene, poly ether ether ketone and polyimide.

* * * * *